United States Patent [19]
Kiriazis et al.

[11] Patent Number: 5,989,715
[45] Date of Patent: Nov. 23, 1999

[54] LAMINATE

[75] Inventors: Leonidas Kiriazis, Münster; Frank Prissok, Lenförde; Karl-Heinz Dickerhof, Drensteinfurt, all of Germany

[73] Assignee: BASF Coatings AG, Muenster-Hiltrup, Germany

[21] Appl. No.: 08/930,110

[22] PCT Filed: May 2, 1996

[86] PCT No.: PCT/EP96/01833

§ 371 Date: Jan. 20, 1998

§ 102(e) Date: Jan. 20, 1998

[87] PCT Pub. No.: WO96/34925

PCT Pub. Date: Nov. 7, 1996

[30]     Foreign Application Priority Data

May 3, 1995  [DE]  Germany ............... 195 16 149

[51] Int. Cl.⁶ .................. B32B 21/08; B32B 27/40; C09D 175/04
[52] U.S. Cl. .................. 428/425.1; 428/423.3; 428/423.7; 428/425.8
[58] Field of Search ............... 428/217, 423.1, 428/423.3, 423.7, 425.1, 425.8

[56]         References Cited

U.S. PATENT DOCUMENTS

| 3,499,783 | 3/1970 | Nelson et al. | 428/161 |
| 4,355,071 | 10/1982 | Chang | 428/334 |
| 5,030,514 | 7/1991 | Hartman | 428/363 |
| 5,288,549 | 2/1994 | Zeitler et al. | 428/318.6 |

FOREIGN PATENT DOCUMENTS

| 0138227 | 4/1985 | European Pat. Off. . |
| 0191666 | 8/1986 | European Pat. Off. . |
| 1469467 | 1/1969 | Germany . |
| 1253108 | 11/1971 | United Kingdom . |
| 1419768 | 12/1975 | United Kingdom . |

*Primary Examiner*—D. S. Nakarani

[57]              ABSTRACT

The present invention relates to a layer product consisting of thermoplastic polyurethane which is stabilized against ultraviolet radiation and is based on diisocyanates, diols as chain extenders, polytetrahydrofuran or linear polyesterdiols.

4 Claims, No Drawings

LAMINATE

FIELD OF THE INVENTION

The present invention relates to a layer product based on thermoplastic polyurethanes which is particularly suitable for producing skis, surfboards and furniture.

BACKGROUND AND SUMMARY OF THE INVENTION

EP-A-287911 discloses five- or six-component layer products and their use for the production of skis, surfboards and furniture parts. Individually, the layers consist of a film of highly transparent thermoplastic, a polyurethane layer which is tack-free at room temperature, a colour layer, an epoxy resin layer and a support and core material of rigid polyurethane foam, wood or aluminum.

FR-A-2660251 likewise discloses a multilayer system which can be used for skis. It describes inter alia a three-layer system consisting of polycarbonate, polyamide and thermoplastic polyurethane.

A disadvantage of the prior art is that the layer products used to date are insufficiently stable to ultraviolet radiation. For this reason, the layer products are generally provided with a clearcoat layer comprising a special UV absorber system.

The object of the present invention, accordingly, was to develop a layer product which renders superfluous the use of a clearcoat layer comprising a special UV absorber system.

This object is surprisingly achieved by means of a layer product consisting of thermoplastic polyurethane which is stabilized against ultraviolet radiation and is based on diisocyanates, diols as chain extenders, polytetrahydrofuran or linear polyesterdiols.

DETAILED DESCRIPTION

Thermoplastic polyurethanes of this kind can be prepared, for example, according to the belt method or the extruder method, by reacting a) organic, preferably aliphatic, cycloaliphatic or, in particular, aromatic diisocyanates,
b) polyhydroxy compounds having molecular weights from 500 to 8000 and
c) chain extenders having molecular weights from 60 to 400 in the presence of, if desired,
d) catalysts,
e) auxiliaries and/or additives.

The starting materials (a) to (c), catalysts (d), auxiliaries and additives (e) which can be used for this purpose are described in more detail below:

a) Suitable organic diisocyanates (a) are preferably aliphatic, cycloaliphatic and, in particular, aromatic diisocyanates. Specific examples are aliphatic diisocyanates, such as hexamethylene 1,6-diisocyanate, methylpentamethylene 1,5-diisocyanate, 2-ethylbutylene 1,4-diisocyanate or mixtures of at least 2 of the $C_6$-alkylene diisocyanates mentioned, pentamethylene 1,5-diisocyanate and butylene 1,4-diisocyanate, cycloaliphatic diisocyanates, such as isophorone diisocyanate, 1,4-cyclohexane diisocyanate, 1-methyl-2,4- and -2,6-cyclohexane diisocyanate and the corresponding isomer mixtures, 2,4'-, and 2,2'-dicyclohexylmethane diisocyanate and the corresponding isomer mixtures, and, preferably, aromatic diisocyanates, such as 2,4-tolylene diisocyanate, mixtures of 2,4- and 2,6-tolylene diisocyanate, 4,4'-, 2,4'- and 2,2'-diphenylmethane diisocyanate, mixtures of 2,4'- and 4,4'-diphenylmethane diisocyanate, urethane-modified liquid 1,2-bis(4,4'- and/or 2,4'- or 4,4'-diisocyanatodiphenyl) ethane and 1,5-naphthylene diisocyanate. Preference is given to the use of hexamethylene 1,6-diisocyanate, 4,4'-dicyclohexylmethane diisocyanate, isophorone diisocyanate, diphenylmethane diisocyanate isomer mixtures having a 4,4'-diphenylmethane diisocyanate content of more than 96% by weight, and, in particular, 4,4'-diphenylmethane diisocyanate.

b) Suitable relatively high molecular weight polyhydroxy compounds (b) having molecular weights of from 500 to 8000 are preferably polyetherols and polyesterols. Also suitable, however, are hydroxyl-containing polymers, for example polyacetals, such as polyoxymethylenes and, in particular, water-insoluble formals, for example polybutanediol formal and polyhexanediol formal, and aliphatic polycarbonates, especially those of diphenyl carbonate and 1,6-hexanediol, prepared by transesterification and having the abovementioned molecular weights. The polyhydroxy compounds must be at least predominantly linear in structure, i.e. difunctional in structure in the context of the isocyanate reaction. The polyhydroxy compounds mentioned can be employed as individual components or in the form of mixtures.

Suitable polyetherols can be prepared by known methods, for example by anionic polymerization with alkali metal hydroxides, such as sodium hydroxide or potassium hydroxide, or alkali metal alcoholates, such as sodium methylate, or potassium methylate or potassium isopropylate as catalysts, or by cationic polymerization with Lewis acids, such as antimony pentachloride, boron fluoride etherate, etc., or bleaching earth as catalysts. Polyether alcohols may be prepared from one or more alkylene oxides having 2 to 4 carbon atoms in the alkylene radical and, if desired, a starter molecule which comprises in bonded form 2 reactive hydrogen atoms. Examples of alkylene oxides which may be mentioned are ethylene oxide 1,2-propylene oxide, tetrahydrofuran, 1,2- and 2,3 butylene oxide. Those employed with preference are ethylene oxide and mixtures of 1,2-propylene oxide and ethylene oxide. The alkylene oxides can be used individually, alternately in succession, or as a mixture. Examples of suitable starter molecules are water, amino alcohols, such as N-alkyldialkanolamines, for example N-methyldiethanolamine, and diols, for example alkanediols or dialkylene glycols having 2 to 12 carbon atoms, preferably 2 to 6 carbon atoms, such as ethanediol, 1,3-propanediol, 1,4-butanediol and 1,6-hexanediol. It is also possible if desired to employ mixtures of starter molecules. Other suitable polyetherols are the hydroxyl-containing polymerization products of tetrahydrofuran (polyoxytetramethylene glycols).

It is preferred to use polyetherols of 1,2-propylene oxide and ethylene oxide in which more than 50%, preferably from 60 to 80%, of the OH groups are primary hydroxyl groups and in which at least part of the ethylene oxide is arranged as a terminal block, and, in particular, polyoxytetramethylene glycols.

Such polyetherols can be obtained by, for example, polymerizing first the 1,2-propylene oxide and then the ethylene oxide onto the starter molecule, or first copolymerizing all of the 1,2-propylene oxide as a mixture with part of the ethylene oxide, and then polymerizing on the remainder of the ethylene oxide, or, in a stepwise procedure, first polymerizing on part of the ethylene oxide, and then all of the 1,2-propylene oxide and then the remainder of the ethylene oxide to the starter molecule.

The essentially linear polyetherols possess molecular weights from 500 to 8000, preferably from 600 to 6000 and, in particular, from 800 to 3500. They can be employed either individually or in the form of mixtures with one another.

Suitable polyesterols can be prepared, for example, from dicarboxylic acids having 2 to 12 carbon atoms, preferably 4 to 8 carbon atoms, and polyhydric alcohols. Examples of suitable dicarboxylic acids are aliphatic dicarboxylic acids, such as succinic acid, glutamic acid, suberic acid, azeleic acid, sebacic acid and, preferably, adipic acid, and aromatic dicarboxylic acids, such as phthalic acid, isophthalic acid and terephthalic acid. The dicarboxylic acids can be used individually or as mixtures, for example in the form of a mixture of succinic, glutaric and adipic acid.

It is likewise possible to employ mixtures of aromatic and aliphatic dicarboxylic acids. For the preparation of the polyesterols it may if appropriate be advantageous to use, instead of the dicarboxylic acids, the corresponding dicarboxylic acid derivatives, such as dicarboxylic esters having 1 to 4 carbon atoms in the alcohol residue, dicarboxylic anhydrides or dicarboxylic acid chlorides. Examples of polyhydric alcohols are alkanediols having 2 to 10, preferably 2 to 6, carbon atoms, such as ethanediol, 1,3-propanediol, 1,4-butanediol, 1,5-pentanediol, 1,6-hexanediol, 1,10-decanediol, 2,2-dimenthyl-1,3-propanediol, 1,2-propanediol and dialkylene ether glycols, such as diethylene glycol and dipropylene glycol. Depending on the desired properties, the polyhydric alcohols can be used alone or, if desired, in mixtures with one another.

Also suitable are esters of carbonic acid with the diols mentioned, especially those having 4 to 6 carbon atoms, such as 1,4-butanediol and/or 1,6-hexanediol, condensation products of α-hydroxy carboxylic acids, for example α-hydroxycaproic acid and, preferably, polymerisation products of lactones, for example substituted or unsubstituted ε-caprolactones.

With respect to polyesterols, preference is given to the use of alkanediol polyadipates having 2 to 6 carbon atoms in the alkylene radical, for example ethanediol polyadipates, 1,4-butanediol polyadipates, ethanediol 1,4-butanediol polyadipates, 1,6-hexanediol neopentyl glycol polyadipates, polycaprolactones and, in particular, 1,6-hexanediol 1,4-butanediol polyadipates.

The polyesterols possess molecular weights (weight average) of from 500 to 6000, preferably from 800 to 3500.

c) Chain extenders (c) having molecular weights from 60 to 400, preferably from 60 to 300, are preferably alkanediols having 2 to 12 carbon atoms, preferably having 2,4 or 6 carbon atoms, for example ethanediol, 1,6-hexanediol and, in particular, 1,4-butanediol and dialkylene ether glycols, for example diethylene glycol and dipropylene glycol. Also suitable, however, are diesters of terephthalic acid with alkanediols having 2 to 4 carbon atoms, for example terephthalic acid bis-ethanediol or bis-1,4-butanediol, hydroxyalkylene ethers of hydroquinone, for example 1,4-di(β-hydroxyethyl)-hydroquinone, (cyclo) aliphatic diamines, for example 4,4'-diaminodicyclohexylmethane, 3,3'-dimethyl-4,4'-diaminodicyclohexylmethane, isophoronediamine, ethylenediamine, 1,2- and 1,3-propylenediamine, N-methyl-1,3-propylenediamine, N,N'-dimethyl-ethylenediamine and aromatic diamines, for example 2,4- and 2,6-tolylenediamine, 3,5-diethyl-2,4- and -2,6-tolylenediamine and primary, ortho- di- tri- and/or -tetraalkyl-substituted 4,4'-diaminodiphenylmethanes.

As chain extenders, use is preferably made of alkanediols having 2 to 6 carbon atoms in the alkylene radical, especially 1,4-butanediol and/or dialkylene glycols having 4 to 8 carbon atoms.

In order to adjust the hardness and melting point of the thermoplastic polyurethanes, the structural components (b) and (c) can be varied within relatively wide molar ratios. Molar ratios of polyhydroxy compounds (b) to chain extenders (c) which have proven suitable are from 1:1 to 1:12, in particular 1:1.8 to 1:6.4, with the hardness and the melting point of the thermoplastic polyurethanes rising as the content of diols increases.

To prepare the thermoplastic polyurethanes the structural components (a), (b) and (c) are reacted in the presence, if desired, of catalysts (d), auxiliaries and/or additives (e) in quantities such that the ratio of equivalents of NCO groups of the diisocyanates (a) to the sum of the hydroxyl groups or hydroxyl and amino groups of components (b) and (c) is from 1:0.85 to 1.20, preferably from 1:0.95 to 1:1.05 and, in particular, from 1:0.98 to 1.02.

d) Suitable catalysts which accelerate, in particular, the reaction between the NCO groups of the diisocyanates (a) and the hydroxyl groups of the structural components (b) and (c) are those tertiary amines which are customary and are known from the prior art, examples being triethylamine, dimethylcyclohexylamine, N-methylmorpholine, N,N'-dimethylpiperazine, 2-(dimethylaminoethoxy)ethanol, diazabicyclo-[2.2.2] octane and the like, and also, in particular, organometallic compounds, such as titanates, iron compounds, for example iron(III) acetylacetonate, tin compounds, for example tin diacetate, tin dioctoate, tin dilaurate or the tin dialkyl salts of aliphatic carboxylic acids, such as dibutyltin diaceate, dibutyltin dilaurate or the like. The catalysts are commonly employed in quantities of from 0.002 to 0.1 part per 100 parts of polyhydroxy compound (b).

e) In addition to catalysts, the structural components (a) to (c) can also have auxiliaries and/or additives (e) incorporated into them. Examples which may be mentioned are lubricants, inhibitors, stabilizers to counteract hydrolysis, light, heat or discoloration, dyes, pigments, inorganic and/or organic fillers, reinforcing agents and plasticizers.

Further details on the abovementioned auxiliaries and additives can be taken from the technical literature, for example the monograph by J. H. Saunders and K. C. Frisch "High Polymers", Volume XVI, Polyurethanes, part 1 and 2, Interscience Publishers 1962 and 1996, Kunststoff-Handbuch [Plastics Handbook], Volume XII, Polyurethanes or DE-A 29 01 774.

As already set out, the thermoplastic polyurethane can be prepared preferably by the belt process. The specific procedure in the belt process is as follows:

The structural components (a) to (c) and, if used, (d) and/or (e) are mixed continuously with the aid of a mixing head at temperatures above the melting point of the structural components (a) to (c). The reaction mixture is applied to a support, preferably a conveyor belt, and passed through a heated zone. The reaction temperature in the heated zone is from 60 to 200° C., preferably from 100 to 180° C., and the residence time is from 0.05 to 0.5 hour, preferably from 0.1 to 0.3 hour. After reaction has ended, the thermoplastic polyurethane is allowed to cool and is then comminuted or granulated.

In the extruder process, the structural components (a) to (c) and, if used, (d) and (e) are introduced, individually or as a mixture, into the extruder. The mixture is reacted at temperatures from 100 to 250° C., preferably from 140 to 220° C., and the thermoplastic polyurethane obtained is extruded, cooled and granulated.

The granules obtained can be stored temporarily or rendered matt directly with the polyolefin homo- and/or copolymers.

Use is preferably made of thermoplastic polyurethanes having a Shore A hardness of from 70 to 98, preferably from 75 to 90, which are prepared by reacting polyoxytetramethylene glycol or, in particular, alkanediol polyadipates having 2 to 6 carbon atoms in the alkylene radical, linear aliphatic and/or cycloaliphatic diisocyanates, for example hexamethylene 1,6-diisocyanate or 4,4-dicyclohexylmethane diisocyanate, and, preferably, aromatic diisocyanates and/or in particular, 4,4'-diphenylmethane diisocyanate and 1,4-butanediol in a ratio of equivalents of NCO—to OH groups of from 1:0.95 to 1.05.

For stabilization against ultraviolet radiation, antioxidants, preferably sterically hindered phenols, are added in accordance with the invention to the thermo-plastic polyurethane. In order to improve further the protection against ultraviolet radiation, it is possible for special UV filter substances to be incorporated into the thermoplastic polyurethane. Preference is given to the use of benzotriazoles to achieve this.

Furthermore, the thermoplastic urethanes can be mixed with substances which act as free-radical scavengers. Compounds particularly suitable for this purpose are sterically hindered amines or epoxide compounds.

The hardness of the thermoplastic polyurethane employed in accordance with the invention depends on the area of application. In principle, the Shore A hardness is between 75 A and 85 D. For the sector of the coating of skis and surfboards, from 45 to 80 D is particularly suitable. In the case of wood coatings, especially for furniture and wooden parts used in the interior sector, it is from 85 A to 45 D.

In a form which is preferred in accordance with the invention, the layer product described is applied to a support. This preferably comprises support materials of glass fiber-reinforced plastic, for example polyester resins, or rigid polyurethane foams, wood or metal. The thermoplastic polyurethane is advantageously overcoated with a clearcoat.

Owing to the use of the polyurethanes which are stabilized against UV radiation, the additional protection by a special UV absorber system in the clearcoat layer is no longer required. This makes it possible then to employ, as the topmost cover layer, a hard, high-gloss, cut-resistant material which is highly flexible at low temperatures. Clearcoats which can be mentioned in particular here are those based on isocyanates, which show outstanding adhesion on the polyurethane surface. This is probably a result of coupling with terminal alcohol groups of the polyurethane, which as a result of the special layer product used in accordance with the invention are now available to a sufficient degree. In addition, the stabilization against UV radiation also makes possible the use of coextruded materials (especially polyethylene terephthalate and polybutylene terephthalate), which have very good mechanical properties and a positive effect on any deep-drawing process which may be necessary.

For coating the thermoplastic polyurethane with clearcoat, use is preferably made in accordance with the invention of coating compositions whose binder comprises hydroxyl-containing acrylic polymers and aliphatic and/or cycloaliphatic polyisocyanates. The coating compositions additionally comprise solvents. If desired, levelling assistants, UV absorbers and free-radical scavengers may also be employed.

In accordance with the invention, the coating compositions involved are preferably two-component polyurethane coating compositions. These consist of
a) one or more polyisocyanate components, preferably two different polyisocyanates,
b) one or more polyhydroxy compounds having hydroxyl group contents of from 0.1 to 10% by weight (=OH number from 3.3 to 330), preferaby from 1 to 6% by weight (=OH number from 33 to 198), and if desired,
c) reactive diluents, i.e. low molecular weight polyol components having at least two isocyanate-reactive groups and hydroxyl group contents of more than 10% by weight.

It is also possible, however, to employ one-component polyurethane coating compositions, i.e. binders which are isocyanate prepolymers having an NCO content of from about 2 to 16% by weight and which are obtained, for example, by reacting di- and/or polyisocyanates with substoichiometric quantities of the polyhydroxy compounds.

The component a) which is present in the binder mixtures according to the invention consists of at least one organic polyisocyanate having a mean NCO functionality of more than 2, preferably from 2.6 to 6. These are the paint polyisocyanates which are known per se, based on simple diisocyanates from the molecular weight range from 168 to 300. These paint polyisocyanates are modification products of the simple diisocyanates, and have uretdione, biuret urethane and/or isocyanurate groups, in which context, after the modification reaction, excess quantities of starting diisocyanates are generally removed, in particular by thin-film distillation, to such an extent that the paint polyisocyanates contain no more than 0.7% by weight, preferably no more than 0.5% by weight, of excess starting diisocyanate. The paint polyisocyanates which are present as component a) in the binder mixtures according to the invention generally have an NCO content of from 8 to 40% by weight, preferably from 10 to 32% by weight.

Examples of diisocyanates which are suitable for preparing the paint polyisocyanates are 2,4-diisocyanatotoluene, its technical-grade mixtures with 2,6-diisocyanatotoluene, 4,4'-diisocyanatodiphenylmethane, its technical-grade mixtures with the 2,4' and if desired 2,2' isomers, and also, if desired, with its higher homologs as are obtained by phosgenization of aniline/formaldehyde condensates; 4,4'-diisocyanatodicyclohexylmethane and its mixtures with 2,4-diisocyanatodicyclohexylmethane, 1,6-diisocyanatohexane (HDI), 1-isocyanato-3,3,5-trimethyl-5-isocyanatomethylcyclohexane (IPDI), or mixtures of these diisocyanates.

The paint polyisocyanates are prepared from the starting diisocyanates mentioned by way of example in accordance with known, prior-art methods. Thus, for example, the paint polyisocyanates containing biuret groups can be prepared by the method of U.S. Pat. Nos. 3,124,605, 3,358,010, 3,903, 126, 3,903,127 or 3,976,622. The preparation of urethane polyisocyanates which can be employed in accordance with the invention takes place, for example, in accordance with U.S. Pat. No. 3,183,112, while the preparation of paint polyisocyanates which contain isocyanurate groups and are suitable in accordance with the invention takes place, for example, by the methods of GB Patents 1 060 430, 1 234 972, 1 506 373 or 1 458 564 or in accordance with U.S. Pat. No. 3,394,111, U.S. Pat. No. 3,645,979 or U.S. Pat. No. 3,919,218. The preparation of the paint polyisocyanates containing isocyanate groups in accordance with the latter publications often gives rise at the same time to dimerization products which contain uretdione groups, which products can be used in accordance with the invention as paint polyisocyanates in a mixture with the polyisocyanates containing isocyanurate groups.

In the process according to the invention, particular preference is given to the use, as hardener component a), of uretdione, biuret, urethane and/or isocyanurate groups based on (cyclo)aliphatic diisoyanates. Particular preference is given to polyisocyanates which contain biuret and isocyanurate groups and are based on HDI and, and also polyisocyanates which may or may not contain uretdione groups and are based on HDI and/or IPDI.

As component b) it is preferred to use polyacrylates. These have molecular weights Mn, as can be determined by gel permeation chromatography using polystyrene as standard, within the range from 1000 to 100,000, preferably from 1000 to 30,000.

Preference is given in accordance with the invention to a composition comprising the following constituents:

A) from 50 to 90% by weight, based on the sum of the acrylic polymers, of a first acrylic polymer having
  a molecular weight of from 800 to 4000,
  a hydroxyl number of from 80 to 180 and
  a glass transition temperature of below −10° C., which has been prepared from
    $a_1$) from 75 to 100% by weight of acrylic esters,
    $a_2$) from 0 to 25% by weight of methacrylic esters, the proportion of components $a_1$ and $a_2$ which are hydroxyalkyl acrylates or hydroxyalkyl methacrylates, respectively, being such that the hydroxyl number obtained is from 80 to 180,
    $a_3$) from 0 to 15% by weight of comonomers having aromatic groups, and
    $a_4$) from 0 to 2% by weight of OC, β-ethylenically unsaturated acids, the sum of components $a_1$ to $a_4$ being 100%.
B) from 10 to 50% by weight, based on the sum of the acrylic polymers, of a second acrylic polymer having
  a molecular weight of from 3000 to 10,000,
  a hydroxyl number of from 40 to 120 and
  a glass transition temperature of from −10° to +70°, which has been prepared from
    $b_1$) from 0 to 30% by weight of acrylic esters,
    $b_2$) from 70 to 90% by weight of methacrylic esters, the proportion of components $b_1$ and $b_2$ which are hydroxyalkyl acrylates or hydroxyalkyl methacrylates respectively, being such that the hydroxyl number obtained is from 40 to 120,
    $b_3$) from 0 to 30% by weight of comonomers having aromatic groups, and
    $b_4$) from 0 to 3% by weight of OC, β-ethylenically unsaturated acids, the sum of components $b_1$ and $b_4$ being 100%, and
C) an aliphatic or cycloaliphatic polyisocyanate or a mixture of such polyisocyanates in a quantity such that for each hydroxyl group of the constituents A) and B) there are from 0.8 to 1.3 isocyanate groups.

The polymer A is prepared by free-radical solution polymerization of the monomers $a_1$ to $a_4$. As component $a_1$ it is possible to employ methyl, ethyl, n-propyl, isopropyl, n-butyl, isobutyl, sec-butyl, t-butyl, n-pentyl, neopentyl, n-hexyl, cyclohexyl, n-octyl, 2-ethylhexyl, N-dodecyl [sic] (laury-1), 2-hydroxyethyl, 4-hydroxybutyl acrylate and hydroxypropyl acrylate. Suitable components $a_2$ are the corresponding esters of methacrylic acid.

It is also possible to employ up to 15% by weight, based on the sum of all comonomers, of monomers having aromatic groups. Suitable examples in this context are styrene, methylstyrene or vinyltoluene (component $a_3$).

As components $a_4$ it is possible to use acrylic acid and/or methacrylic acid in a proportion of up to 2% by weight. The polymerization is carried out such that the resulting polymer A has a molecular weight, measured by gel permeation chromatography, of 800 to 4000. The establishment of this molecular weight can be achieved by appropriately controlling the process parameters such as temperature, nature and quantity of initiator, concentration and time.

In addition to the binder constituents mentioned, the coating composition according to the invention comprises organic solvents, for example xylene, toluene, other alkylbenzenes, ethyl acetate, butyl acetate, ethylglycol acetate and/or ketones. The coating composition can additionally comprise levelling assistants, for example silicone oils, and UV absorbers and free-radical scavengers, for example sterically hindered tertiary amines, benzine phenol derivatives and oxanilides.

The polyacrylate component b) is preferably prepared in a multistage, preferably two-stage process in a reaction vessel. In the individual stages, polymerization is carried out by the generally known feed process. Where it is carried out in two process stages, polymers having a bimodal molecular weight distribution are obtained. The establishment of the mean molecular weights of the copolymers synthesized in the individual stages can be established by the chosen polymerization temperature, initiator, monomer concentration and by means of substances which act as free-radical transfer agents. It is preferred to vary only the polymerization temperature and/or the concentration of initiator/monomers, with very particular preference being given to the simultaneous alteration of both variables.

In the first stage of this procedure, a comonomer mixture and an initiator mixture are metered into an organic solvent. At a low temperature and/or low concentration of initiator, a comonomer mixture having a low concentration of unsaturated hydroxy-functional monomers is polymerized. The hydroxyl group content, based on the solid resin, is from 0.1 to 4% by weight, preferably from 0.3 to 2% by weight, but employing less than 50% by weight, preferably less than 30%, of monomers which carry hydroxyl groups, based on the overall quantity of the monomers employed. This stage produces the high molecular weight component of the mixture.

In a second stage, a second comonomer preparation whose concentration and/or composition is different is incorporated by polymerization into the mixture of already polymerized polymer/solvent, it being necessary for the temperature and/or concentration of initiator to be higher than in the first step of the process.

In this context, a relatively high concentration of hydroxy-functional acrylate monomers is employed. The hydroxyl group content, based on the solid resin, is from 0.5 to 8% by weight, preferably from 1 to 5% by weight. This produces the low molecular weight component of the mixture.

It is of course also possible to run through the above-described process stages in the opposite manner.

After the copolymerization reaction, it is possible if desired to remove any remaining traces of readily volatile monomers by "incipient distillation" of the copolymerization mixture.

In general the polymerization temperature is within the range from 40 to 190° C., with the properties of the copolymers, especially their molecular weight, being established as already indicated by appropriate choice of the reaction temperature and the initiation rate of the initiator. The half-life of the initiators employed should be not less than one second and not more than one hour. The nature of the initiators and the reaction temperature are preferably chosen such that the half-life is from 1 to 20 minutes. The high molecular weight component is preferably prepared at the same or at a lower temperature, in comparison with the preparation of the low molecular weight component.

The concentration of initiator or initiator mixture can be identical or different for the two process stages. When preparing the copolymer having the on average higher molecular weight it is preferred to use less initiator, particularly preferably less than half the quantity used for the synthesis of the copolymer having the on average lower molecular weight.

In order to regulate the molecular weight it is possible in addition to employ auxiliaries which act as transfer agents, such as, for example, mercaptan compounds.

In order to initiate the free-radical polymerization it is possible to use peroxide compounds, for example symmetrical diacyl peroxides, for example acetyl, propionyl and butyryl peroxide, and also lauryl peroxide, symmetrical peroxydicarbonates, for example diethyl, diisopropyl, dicyclohexyl and dibenzyl peroxydicarbonate, dibenzoyl peroxide and bromo-, nitro-, methyl or methoxy-substituted benzoyl peroxides, dicumyl peroxide, cumene hydroperoxide, di-tert-butyl peroxide, tert-butyl peroxy-2-ethylhexanoate, tert-butyl perpivalate, tert-butyl peroctoate, tert-butylphenyl peracetate, tert-butyl N-(phenylperoxy)carbonate [sic], tert-butyl N(2,3- or 4-chlorophenyl-peroxy)carbonate [sic], tert-butyl hydroperoxide, 2,2-di-tert-butylperoxybutane, tert-amylperbenzoate, 1,3-bis(tert-amylperoxy)propane and ethyl 3,3-di (tert-amylperoxy)butyrate, butanone peroxide; aliphatic azo compounds, for example azobisisobutyronitrile and azobiscyclohexanenitrile, azobis-2-methylvaleronitrile, alkyl 2,2'-azobisisobutyrates or thermally labile, highly substituted ethane derivatives, based for example on benzopinacol and based on silyl-substituted ethane derivatives, or else high-energy radiation.

Particularly suitable monomers for the preparation of copolymers b) are 1. monomers containing alcoholic hydroxyl groups,
2. monomers which do or do not contain anhydride groups and do not contain active hydrogen atoms, and if desired
3. other functional monomers.

Suitable monomers from group 1 are, in particular, hydroxyalkyl esters, of OC, β-unsaturated carboxylic acids, especially of acrylic acid or methacrylic acid, having 2 to 12, preferably 2 to 6 carbon atoms, in the hydroxyalkyl radical. Examples which may be mentioned are 2-hydroxyethyl acrylate, 2-hydroxypropyl acrylate, 1-hydroxymethylethyl acrylate, 2-, 3- and 4-hydroxybutyl acrylate, the isomeric hydroxypentyl acrylates, the isomeric hydroxyhexyl acrylates, and the methacrylates corresponding to these acrylates. The hydroxyl-containing hydroxyalkyl esters can contain both primary and secondary hydroxyl groups. Also possible in principle is a variant according to which the hydroxyl-containing monomers mentioned by way of example can be replaced in whole or in part by modification products which are obtained by subjecting the hydroxyalkyl (meth)acrylates mentioned by way of example to a modification reaction. Examples of such suitable modification reactions are the addition reaction of cyclic esters, for example ε-caprolactone, with ring-opening ester formation, or the addition reaction of epoxides, for example ethylene oxide, propylene oxide or butylene oxide, or 2-ethylhexyl glycidyl ether, in the manner of a ring-opening ether formation. Instead of the addition reaction of epoxides with hydroxyalkyl esters of the specified type it is also of course possible, in the course of their preparation by alkoxylation of acrylic acid or methacrylic acid, to employ correspondingly higher quantities of alkylene oxides (more than 1 mole of alkylene oxide per mole of acid); so that esters of the acids specified, containing hydroxyl and ether groups, are produced directly, which esters can then be employed as monomers from group 1. The use of such monomers containing ether groups or else additional ester groups, however, is in no way preferred. Moreover, the modification of the copolymers prepared using unmodified hydroxyalkyl (meth) acrylates in the context of such addition reactions, following on from the preparation of the copolymers, is conceivable and would constitute a mode of operation equivalent to the use of modified monomers.

Monomers from group 2 are, in particular, monoolefinically unsaturated compounds from the molecular weight range from 53 to 400, preferably from 80 to 220. They include, for example, acrylic acid or methacrylic acid alkyl esters or cycloalkyl esters having 1 to 18, preferably 1 to 6, carbon atoms in the alkyl or cycloalkyl radical, such as, for example, methyl, ethyl, n-propyl, n-butyl, isopropyl, isobutyl, t-butyl, the isomeric pentyl, hexyl, octyl, dodecyl, hexadecyl or octadecyl esters of said acids, the 3,4,5-trimethylcyclohexyl, isobornyl or cyclohexyl esters of said acids, acrylonitrile, vinyl ethers, methacrylonitrile vinyl acetate, vinyl chloride, styrene, vinyl toluene or else anhydride-functional unsaturated monomers, such as itaconic anhydride or maleic anhydride, or any desired mixtures of such monomers.

Examples of the optional monomers from group 3, which are generally used in quantities of up to 5.0% by weight, preferably from 0.1 to 3.0% by weight, based on the overall weight of all monomers, include carboxyl-containing unsaturated monomers such as, for example, acrylic acid, methacrylic acid, itaconic acid, crotonic acid and monoesters of maleic and fumaric acid, and also mixtures thereof, epoxide-functional unsaturated monomers, such as glycidyl methacrylate, glycidyl acrylate, or reaction products of (i) acids such as acrylic acid, methacrylic acid, maleic acid, fumaric acid, itaconic acid or crotonic acid with (ii) polyepoxides such as, for example, bisphenol A diglycidyl ether.

The solvent used as polymerization medium can be selected for example from the group consisting of toluene, xylene, chlorobenzene, butyl acetate, ethyl acetate, ethyl glycol acetate, pentyl acetate, hexyl acetate, methoxypropyl acetate, tetrahydrofuran, dioxane, acetone, methyl ethyl ketone, relatively highly substituted aromatic compounds, for example Solvent NAPHTA®, heavy benzene, various SOLVESSO® grades, various SHELLSOL® grades and DEASOL®, and also relatively high-boiling aliphatic and cycloaliphatic hydrocarbons, for example various white spirits, mineral terpentine oil, ISOPAR® grades, NAPPAR® grades, tetralin and decalin, and mixtures of such solvents.

As solvents it is possible also to use, to a minor extent, reactive diluents and low-viscosity polyols, which are able to react with the molecules of the crosslinking agent.

The coating composition mixtures according to the invention can, in addition to the essential components a) and b), also contain if desired c) reactive diluents in a quantity of up to 5% by weight based on the weight of component b). Reactive diluents are, in particular, polyhydric alcohols from the molecular weight range from 62 to 200, for example ethylene glycol, propylene glycol, 1,4-butanediol, 2-ethyl-1,3-hexanediol, 1,6-hexanediol or any desired mixtures of such polyhydric alcohols. These reactive diluents can be incorporated into component b) after its preparation or even during its preparation, as part of the solvent.

The binder mixtures may also comprise further auxiliaries and additives, especially solvents of the type employed in the preparation of component b).

The quantitative ratios of the reactive components (isocyanate component a) on the one hand and components b) and, if used, c) on the other hand are otherwise such that the ratio of NCO/OH equivalents is from 0.2:1 to 5:1, preferably from 0.7:1 to 1.3:1.

In the preparation of ready-to-use coating compositions using the binder mixtures according to the invention it is possible to mix these with other additives and auxiliaries which are customary from the technology of polyurethane coatings. These include, for example, leveling agents, UV absorbers, free-radical scavengers and additives based on cellulose esters, oligoalkyl acrylates, pigments and fillers, viscosity-controlling additives, such as bentonites and silicates, matting agents, for example silicic acid, aluminum silicates, and high molecular weight waxes or catalysts for the isocyanate addition for example tin(II) octoate or dimethylbenzylamine.

The coating compositions employed in accordance with the invention feature a long pot life, very rapid drying times at temperatures from 10 to 60° C., good leveling, and color faithfulness and clarity, and outstanding mechanical properties of the coatings obtained with them.

The coating compositions prepared using the binder mixtures according to the invention can be applied by any desired methods of coatings technology, for example spraying, brushing, dipping, flow coating or rolling, to any desired substrates, for examples metals, wood, masonry, concrete, glass, ceramic, plastics, textiles or paper. A particularly preferred substrate is polyurethane sheet.

Polyesters such as polyethylene terephthalate, polybutylene terephthalate [sic] and polyesters based on terephthalic acid, ethylene glycol and butylene glycol can also be employed. Also suitable are other polyesters based on terephthalic acid, isophthalic acid and phthalic acid and on various polyols, for example polyethylene glycol and polytetramethylene glycols at various degrees of polymerization.

Examples of appropriate commercial products are HOSTAPHAN®, MELINEX® and HOSTADUR®, ULTRADUR®.

An example of a suitable polyurethane-based commercial product which may be mentioned is ELASTOLAN® from BASF AG.

The individual layers can be joined using conventional adhesion promoters. It should, however, be emphasized that the adhesion of hard thermoplastics to the thermoplastic polyurethanes according to the invention, especially to the soft thermoplastic polyurethanes, is outstanding. For this reason it is possible in accordance with the invention to work with a combination of thermoplastic polyurethanes of relatively low and relatively high hardnesses. The softer polyurethanes act as an adhesion promoter layer while the hard polyurethanes ensure good strength and wear resistance.

The adhesion promoters can be copolymers, terpolymers, graft copolymers and ionomers, with the proviso that they contain carboxyl groups, anhydride groups or groups which can be hydrolyzed to carboxyl groups, and that the melt index of the polymers, measured at 190° C. under a load of 2.16 kg, is between 0.1 and 30 g/10 min, preferably between 0.2 and 25 g/10 min and, with particular preference, between 0.5 and 20 g/10 min.

Suitable copolymers and terpolymers can be prepared by copolymerization of ethylene and α, β-unsaturated carboxylic acids such as, for example, acrylic acid, methacrylic acid, itaconic acid, crotonic acid, isocrotonic acid, maleic acid and fumaric acid, the corresponding anhydrides or the corresponding esters or monoesters having 1 to 8 carbon atoms in the alcohol radical, for example methyl, ethyl, propyl, butyl, pentyl, hexyl, cyclohexyl, heptyl, octyl and 2-ethylhexyl esters of the acids listed. It is likewise possible to employ the corresponding salts of the listed carboxylic acids, for instance the sodium, potassium, lithium, magnesium, calcium, zinc and ammonium salts. The carboxylic acids and their anhydrides are preferably employed.

In the course of the copolymerization it is also possible to employ other monomers which can be copolymerized with ethylene and the unsaturated carbonyl compounds. Suitable examples are alpha-olefins having 3 to 10 carbon atoms, vinyl acetate and vinyl propionate.

In this context, the quantities of the monomers employed are chosen such that the corresponding polymer has a carboxyl group content of from 0.1 to 30% by weight, preferably from 2 to 20% by weight, and that the content of ethylene units in the polymer is up to 99.9% by weight, preferably between 75 and 95% by weight.

Suitable graft copolymers can be prepared by grafting at least one polymer from the group consisting of polyolefins with up to 10% by weight, preferably UP to 5% by weight, based on the overall weight of the monomers, and at least one monomer from the group of the alpha, α, β-unsaturated carboxylic acids, their anhydrides, their esters or salts in the presence or absence of peroxides. Examples of suitable polyolefins are the polyolefins already listed in the description of the cover layers of this description. Examples of suitable carbonyl compounds are the carbonyl compounds listed above in the description of the copolymer-based adhesion promoters.

The ionomers which are employed as an adhesion promoter layer can be prepared by means of the copolymerization, already described above, of ethylene, and if desired, other monomers with salts of α-, β-unsaturated carboxylic acids, or by partial neutralization of the carboxylic acid-containing copolymers, terpolymers and graft polymers already described above with salts, oxides and hydroxides of sodium, potassium, lithium, magnesium, calcium, zinc and ammonium. The neutralization can be carried out in the melt or in the solution. The quantity of basic compound in this context is chosen such that the degree of neutralization of the polymer is between 0.1 and 99%, preferably between 0.1 and 75% and, with very particular preference, between 0.1 and 40%.

Polyurethane-based adhesion promoters are also suitable.

Both the adhesion promoter layer and the thermo-plastic layer can also comprise customary additives such as, for example, internal and external lubricants, antiblocking agents, stabilizers, anti-oxidants, pigments, crystallization auxiliaries and the like. These additives are employed in the form of fine or coarse powders, beads or in the form of a concentrate which is incorporated directly into the corresponding polymer, in the quantities which are necessary for preparation, processing, formulation and use. Further details on the quantities customarily employed, and examples of suitable additives, can be found for example in Gächter-Müller, Kunststoff additive [Plastics additives], Carl-Hanser Verlag. These additives are preferably incorporated into the thermoplastic layer.

The adhesives used if desired are preferably applied by application from solutions or dispersions in water or organic solvents. The solutions or dispersions generally have an adhesive content of from about 5 to 60% by weight. The quantity of adhesive applied is in general from about 1 to 10 g/m$^2$. Particularly suitable adhesives are the synthetic adhesives consisting of thermoplastic resins such as cellulose esters, cellulose ethers, alkyl esters or acrylic esters, polyamides, polyurethanes and polyesters, of thermosetting resins such as epoxy resins, urea/formaldehyde resins, phenol/formaldehyde resins and melamine/formaldehyde resins, or of synthetic rubbers.

In addition to the coatings mentioned, it is also possible in accordance with the invention to carry out pigmentations. It is preferred to arrange a pigment-containing layer below the layer product comprising thermoplastic polyurethanes. When an adhesion promoter is used, this layer is arranged either directly on the support material or directly below the polyurethane layer.

The layer products prepared in the manner described are suitable for the coating of a very wide variety of materials, preferably plastics, wooden panels, chipboard and metals. A preferred area of application is in the production of sports equipment, especially skis and surfboards. The reason for this is that in this sector there is a very great need to employ hard, cut-resistant material which is flexible at low temperatures, and resistant to UV light. As has already been described above, the UV resistance is achieved by the use of the antioxidants and free-radical scavengers in the thermoplastic polyurethane. At the same time, this polyurethane exhibits good strength and constant wear properties. On the other hand, the thermoplastic polyurethanes adhere particularly well to other thermoplastics and thermosets.

The clearcoat layer, however, is no longer necessary in order to produce the required UV resistance. Because of this it is now possible—as likewise described above—to achieve particularly good adhesion on the surface of the thermoplastic polyurethane. At the same time it is now possible to use topcoat layers whose sole function is to be hard, highly glossy, flexible at low temperatures and resistant to cuts. On the basis of these properties which can now be achieved, the layer products according to the invention are particularly suitable for the production of skis and surfboards.

However, the properties described also give rise to the possibility of use for coatings of woods for the interior and exterior sector. This applies in particular to furniture and to furniture parts which must be particularly highly glossy, flexible at low temperatures, cut-resistant, hard and/or wear-resistant.

In the text which follows, the invention is described in more detail with reference to the examples:

A) EXAMPLES OF UV-STABILIZED POLYURETHANE

1. Polyetherpolyurethane of Shore hardness 74 D:
1000 parts of polytetrahydrofuran MW 1000 (PTHF 1000)
1650 parts of 4,4'-diphenylmethane diisocyanate
504 parts of 1,4-butanediol
0.5% pentaerythrityl tetrakis [3-(3,5-di-tert-butyl-4-hydroxyphenyl)propionate]
2. Polyetherpolyurethane of Shore hardness 60 D:
1000 parts of polytetrahydrofuran MW 1000 (PTHF 1000)
1200 parts of 4,4' diphenylmethane diisocyanate
342 parts of 1,4-butanediol
1% pentaerythrityl tetrakis [3-(3,5-di-tert-butyl-4-hydroxyphenyl)propionate]
3. 1000 parts of polyoxybutylene glycol of mean molecular weight 1000 (PTHF 1000) [sic]
600 parts of 4,4' diphenyl diisocyanate 126 parts of 1,4-butanediol +1% antioxidant Mechanical properties: tensile strength 50 Mpa elongation at break 600% abrasion according to DIN 25 mm$^3$
4. Polyether polyurethane of Shore hardness 45 D
1000 parts of PTHF 1000
1100 parts of methyldiphenyl diisocyanate 306 parts of 1,4-butanediol +0.5% antioxidant
5. Polyester polyurethane of Shore hardness [lacuna]
1000 parts of poly-1,4-butanediol 1,6-hexanediol adipatediol MG 2000
425 parts of methyldiphenyl diisocyanate
106 parts of 1,4-butanediol
10 parts of carbodiimide
6. Polyester polyurethane of Shore hardness [lacuna]
1000 parts of poly-1,4-butanediol ethylenediol MW 1000
670 parts of methyldiphenyl diisocyanate
149.5 parts of 1,4-butanediol
10 parts of carbodiimide as protection against hydrolysis
7. Polyester polyurethane
1000 parts of poly-1,4-butanediol ethylenediol
440 parts of methyldiphenyl diisocyanate
121 parts of 1,4-butanediol
10 parts of carbodiimide
8. Polyester polyurethane
1000 parts of poly-1,4-butanediol adipate
300 parts of methyldiphenyl diisocyanate
90.9 parts of 1,4-butanediol
10 parts of carbodiimide Preparation in both examples was in accordance with the belt or extruder process.

Stabilization is carried out with 0.5% 1,3,5-triglycidylisocyanurate 0.5% 2-(2-hydroxy-3,5-di-tert-amylphenyl)-2H-benzotriazole

B) EXAMPLE OF THE PREPARATION OF A CLEARCOAT

1. Preparation of an Acrylate Resin

In a reaction vessel fitted with monomer feed, initiator feed, thermometer, oil heating and reflux condenser, 20.35 g of pentyl acetate are heated to 137° C. 7m44 [sic] g of t-butyl perethyhexanoate (initiator) are metered in at a uniform rate over the course of 4 h and 30 min. Fifteen minutes after beginning the metering in of the initiator, a monomer mixture consisting of 6.88 g of ethylhexyl acrylate, 14.44 g of ethylhexyl methacrylate, 11.93 g of cyclohexyl methacrylate, 28.58 g of 2-hydroxypropyl methacrylate and 0.16 g of acrylic acid is added at a uniform rate over a period of 4 h. After the end of the addition of the initiator, the reaction temperature is held at 137° C. for 1 h, before the mixture is cooled to 100° C. and a further 0.61 g of t-butyl perethylhexanoate is added at a uniform rate over a period of 1 h. This reaction mixture is maintained at 110° C. until the solids content is about 72% and the viscosity of a 50% strength solution of a reactor sample in solvent naphtha is in the range 1.0–2.5 dpas (plate/cone viscometer). The mixture is then cooled and adjusted with pentyl acetate to a solids content of 65%.

2. 2-component Clearcoat

In order t o prepare the clearcoat, 1.4 g of UV absorber (Ciba-Geigy), 1.0 g of free-radical scavenger (Ciba-Geigy), 0.1 g of a commercial leveling agent from Bayer and 0.03 g of tin catalyst are added to 69.7 g of acrylate resin. The mixture is adjusted using nonprotic solvents, such as butylglycol acetate, butyldiglycol, butyl acetate and solvent naphtha to a viscosity of 23 seconds in the DIN 4 cup.

The hardener solution used is a 65% strength solution in butyl acetate/solvent naphtha (1:3) of a mixture of a polyisocyanate based on isophorone diisocyanate and a polyisocyanate based on hexamethylene diisocyanate (2:1). The quantity of hardener solution added to the clearcoat is such that a ratio of NCO/OH equivalents results which is 1:1.

C) SAMPLE PRETREATMENT

The sheets coated with the UV-stabilized polyurethane according to Examples A 1–8 are wiped over, prior to the application of the 2-component clearcoat, with a solvent mixture comprising solvent naphtha, 1-methoxypropyl [sic] 2-acetate, methoxypropanol, butylglycol and butylglycol acetate.

Application and Drying

The 2-component clearcoat was sprayed using a flow-cup gun (nozzle aperture 1.2 mm; air pressure 4.5 bar) onto sheets coated with polyurethane in accordance with Example A. Application was made at an air temperature of 23° C. The PU sheets coated in this way were flashed off at 23° C. for 10 minutes and then at 80° C. for 10 minutes, and then baked in a convection oven at 130° C. for 30 minutes before being cooled and assessed.

The coating obtained shows very good evenness, very good low-temperature flexibility, UV resistance, scratch resistance and, in particular, very good adhesion to the substrate.

By increasing the concentration of catalyst of the 2-component clearcoat and/or by using acrylate resins having primary OH groups it is possible for the person skilled in the art to increase the reactivity of the 2-component clearcoat to such an extent that room temperature-curing 2-component clearcoats can be obtained. Furthermore, by altering the quantities of solvent in the 2-component clearcoat (=viscosity alteration, it is possible to use other application techniques, such as rolling, knife-coating, dipping, etc.)

By means of the selection of acrylate monomers and/or polyisocyanates, the person skilled in the art is able to adjust both the flexibility or hardness and the crosslinking density of the coating film.

What is claimed is:

1. A layer product consisting of:
  a) a layer of clearcoat;
  b) a layer of thermoplastic polyurethane, wherein the thermoplastic polyurethane comprises antioxidants for stabilization against ultraviolet radiation, wherein the thermoplastic polyurethane comprises compounds which act as free-radical scavengers, wherein the thermoplastic polyurethane comprises compounds which act as filters to ultraviolet radiation, wherein the thermoplastic polyurethane has a hardness of from 75 Shore A to 85 Shore D; and
  c) a support material layer, wherein the support material layer is an article of sports equipment.

2. The layer product in accordance with claim 1, wherein the article of sports equipment is selected from the group consisting of skis and surfboards.

3. A layer product consisting of:
  a) a layer of clearcoat;
  b) a layer of thermoplastic polyurethane, wherein the thermoplastic polyurethane comprises antioxidants for stabilization against ultraviolet radiation, wherein the thermoplastic polyurethane comprises compounds which act as free-radical scavengers, wherein the thermoplastic polyurethane comprises compounds which act as filters to ultraviolet radiation, wherein the thermoplastic polyurethane has a hardness of from 75 Shore A to 85 Shore D; and
  c) a support material layer, wherein the support material layer is selected from the group consisting of wood and chipboard.

4. A layer product consisting of:
  a) a layer of clearcoat;
  b) a layer of thermoplastic polyurethane, wherein the thermoplastic polyurethane comprises antioxidants for stabilization against ultraviolet radiation, wherein the thermoplastic polyurethane comprises compounds which act as free-radical scavengers, wherein the thermoplastic polyurethane comprises compounds which act as filters to ultraviolet radiation, wherein the thermoplastic polyurethane has a hardness of from 75 Shore A to 85 Shore D; and
  c) a support material layer, wherein the support material layer is an article selected from the group consisting of articles of furniture and furniture parts.

* * * * *